United States Patent
Eschenbach (10) Patent No.: US 7,494,449 B2
(45) Date of Patent: Feb. 24, 2009

(54) ADJUSTABLE DRIVE FOR EXERCISE APPARATUS

(76) Inventor: Paul William Eschenbach, 290 S. Tyger La., Roebuck, SC (US) 29376

( * ) Notice: Subject to any disclaimer, the term of this patent is extended or adjusted under 35 U.S.C. 154(b) by 904 days.

(21) Appl. No.: 10/973,597

(22) Filed: Oct. 27, 2004

(65) Prior Publication Data

US 2005/0085344 A1    Apr. 21, 2005

Related U.S. Application Data

(63) Continuation-in-part of application No. 10/303,938, filed on Nov. 26, 2002, now Pat. No. 6,830,538.

(51) Int. Cl.
*A63B 22/06* (2006.01)
(52) U.S. Cl. .......................... 482/57; 482/52
(58) Field of Classification Search .............. 482/51, 482/52, 53, 57, 58, 59, 60, 61, 62, 63, 64, 482/65, 79, 80
See application file for complete search history.

(56) References Cited

U.S. PATENT DOCUMENTS

| | | | |
|---|---|---|---|
| 2,088,332 A | 7/1937 | Marchou | 74/57 |
| 5,261,294 A | 11/1993 | Ticer et al. | 74/594.1 |
| 5,419,572 A | 5/1995 | Stiller et al. | 280/252 |
| 5,433,680 A | 7/1995 | Knudsen | 482/57 |
| 5,743,834 A | 4/1998 | Rodgers | 482/57 |
| 5,833,583 A | 11/1998 | Chuang | 482/60 |
| 5,836,855 A | 11/1998 | Eschenbach | 482/57 |
| 5,938,570 A | 8/1999 | Maresh | 482/57 |
| 6,027,431 A | 2/2000 | Stearns et al. | 482/52 |
| 6,334,836 B1 | 1/2002 | Segasby | 482/4 |
| 6,338,698 B1 | 1/2002 | Stearns et al. | 482/52 |
| 6,565,486 B2 * | 5/2003 | Stearns et al. | 482/52 |
| 6,764,431 B2 * | 7/2004 | Yoss | 482/56 |
| 2002/0198084 A1 | 12/2002 | Stearns et al. | |

* cited by examiner

*Primary Examiner*—Loan H Thanh
*Assistant Examiner*—Tam Nguyen (57) ABSTRACT

The present invention relates to an adjustable drive mechanism that converts a force supplied from an operator or other means along an adjustable curve path into rotary motion. More particularly, the present invention relates to an adjustable drive mechanism configured for an operator driven or motor driven exercise apparatus such as a stationary bicycle, recumbent stationary bicycle, cross trainer or other devices such as a bicycle. The present invention relates to the kinematic motion control of pedals which follow more complex curves that can be changed with the adjustable drive. More particularly, an adjustable drive mechanism based upon a pair of crank linkages and belt assembly can be incorporated into several exercise apparatus to drive a load resistance.

20 Claims, 7 Drawing Sheets

ADJUSTABLE DRIVE FOR EXERCISE APPARATUS

This application is a continuation-in-part of U.S. patent application Ser. No. 10/303,938 filed Nov. 26, 2002, now U.S. Pat. No. 6,830,538.

BACKGROUND OF THE INVENTION

1. Field

The present invention relates to a drive mechanism that converts a force supplied from an operator or other means along an adjustable curve path into rotary motion. More particularly, the present invention relates to an adjustable drive mechanism configured for an operator driven or motor driven exercise apparatus such as a stationary bicycle, recumbent stationary bicycle, cross trainer or other devices.

2. State of the Art

The benefits of regular exercise to improve overall health, appearance and longevity are well documented in the literature. For exercise enthusiasts, the search continues for safe apparatus that provides exercise for maximum benefit in minimum time with less boredom.

Exercise bikes currently use simple cranks to guide the feet along a circular path while receiving operator force to rotate a flywheel. Several attempts have been made to guide the feet along an elliptical path while seated for exercise such as Eschenbach in U.S. Pat. No. 5,836,855 and Maresh in U.S. Pat. No. 5,938,570. Knudsen in U.S. Pat. No. 5,433,680 shows an elliptical path generating mechanism with pedals having only one pivot allowing the pedal to rotate unconstrained about the pivot as in a bicycle crank. Marchou in U.S. Pat. No. 2,088,332 shows a gear pair configured to receive force from a piston. Stiller et al. in U.S. Pat. No. 5,419,572 shows a pair of gear stacks used to guide foot pedals along an elliptical path for a bicycle. Ticer et al. in U.S. Pat. No. 5,261,294 shows an adjustable elliptical crank using gears applicable for exercise.

Recently, a new category of exercise equipment has appeared on the commercial market called elliptical cross trainers. These cross trainers guide the feet along a generally elliptical shaped curves to simulate the motions of jogging and climbing. Several commercial cross trainers are now offered with elliptical foot movement that can be changed when desired by an operator.

Rodgers in U.S. Pat. No. 5,743,834 shows an elliptical cross trainer having an adjustable crank where a motor attached to a moving crank arm can change crank length using gears and screw threads. Stearns et al. in U.S. Pat. No. 6,027,431 shows an elliptical cross trainer having an adjustable crank where gear pairs and a spiral slot operated by a stationary motor change the length of a crank arm. Other variations of an adjustable crank are shown in Stearns et al. in U.S. Pat. No. 6,338,698 and U.S. Pat. application No. 2002/0198084 A1 using various linkage and slotted discs.

There is a need for a drive mechanism to guide a pedal, foot support, connector link or handle along an adjustable curve that is easier to fabricate than the prior art. There is a further need for an adjustable drive mechanism that can be incorporated in an exercise apparatus or other device where the drive pivot such as a pedal follows an adjustable curve during operation of the exercise apparatus. There is a further need for a drive mechanism that changes radius on a periodic basis.

It is one objective of this invention to provide an adjustable drive that allows variable pedal movements. Another objective of this invention is to integrate the adjustable drive into several exercise apparatus. Yet another object of this invention is to provide an indirect application of the adjustable drive to adjust pedal path curves for exercise apparatus.

SUMMARY OF THE INVENTION

The present invention relates to the kinematic motion control of pedals which follow more complex curves that may be changed. More particularly, an adjustable drive mechanism based upon a linkage and belt assembly can be incorporated into several exercise apparatus to drive a flywheel.

In the preferred embodiment, a pair of crank linkage each having a drive pivot to receive operator force rotate about a pivot axis. Each crank linkage includes a crank arm, crank link, adjustment arm and an adjustment link. In this embodiment, the drive pivot is positioned at the end of the crank link. Movement of the adjustment arm relative to the crank arm cause the predetermined distance from each drive pivot to the pivot axis to change. Both adjustment arms and crank arms are configured to rotate about the pivot axis. The adjustment arms are connected generally opposed to an adjustment shaft. The crank arms are also positioned generally opposed but each is attached to a separate crankshaft positioned concentric to the adjustment shaft.

A belt assembly controls the relative angular position of each adjustment arm to each crank arm configured such that a change of position for a pair of timing belt pulleys will change the predetermined distance between the drive pivots and the pivot axis. A set of timing belt pulleys are attached to the adjustment shaft and crankshafts. A jackshaft contains similar pulleys positioned distal the pivot axis.

Timing belts engage the pulleys such that the adjustment shaft, crankshaft and jackshaft rotate at the same speed. Idler pulleys are positioned on brackets intermediate the pivot axis and jackshaft. A pair of movable pulleys are pivotally attached to a slider link that is configured to be movable in a direction generally perpendicular to a plane connecting the pivot axis to the jackshaft. One of the timing belts engage the movable pulleys, idler pulleys, adjustment shaft and jackshaft. Movement of the slider link during operation or while not moving changes the angular relationship between the adjustment arms and crank arms resulting in a change of the predetermined distance. While timing belts are used in the preferred embodiment, chains or other form of flexible linking may also be used. The position of the slider link can be determined manually using a handle and screw thread or an electrically controlled actuator from a remote location.

The adjustable drive has application in many exercise apparatus such as stationary or moving bicycles, recumbent cycles, tread climbers, steppers, cross trainers and hand operated devices. Further, application can extend to other apparatus outside the field of exercise that use a crank where a change of crank length can provide adjustment to the performance of the apparatus. The adjustable drive can be used to convert operator force into rotary motion or a motor can drive the jackshaft or crankshaft to move a device for adjustable passive exercise or other adjustable function.

Application of the adjustable drive to an elliptical cross trainer will allow the foot pedal path to be changed. Application of the adjustable drive to cycling will provide a wider range of motion for the feet and can develop more or less power to drive a vehicle. Use of the adjustable drive to a dependent stepper or tread climber will change the up and down motion of the foot supports. An upper body hand crank using the adjustable drive allows the hand motion to change without stopping the apparatus.

A control system can be used to change the actuator in all of the applications during operation of the apparatus according to a program. One such program applied to an elliptical cross trainer would provide for a short stride gradually increasing to a long stride during operation over some time interval. Alternately, an operator can select a different stride remotely by a control change. In the case of stationary cycling, multiple spinning bikes, each having the adjustable drive, would be controlled together by a class trainer to challenge the exercisers.

The adjustable drive provides a means to enhance versatility of a variety of exercise apparatus with the operator providing the force to drive the apparatus. Alternately, a motor can be attached to any of the applications to rotate the adjustable drive for an adjustable passive system to rehabilitate the arms and legs or other usage.

In summary, this invention provides the user with an adjustable drive that can be incorporated into a variety of exercise apparatus or other devices. A change of the adjustable drive will produce a different pedal movement to reduce the boredom of exercise, exercise different muscles or to accommodate different size operators.

DETAILED DESCRIPTION OF THE EMBODIMENTS

Figure 1:
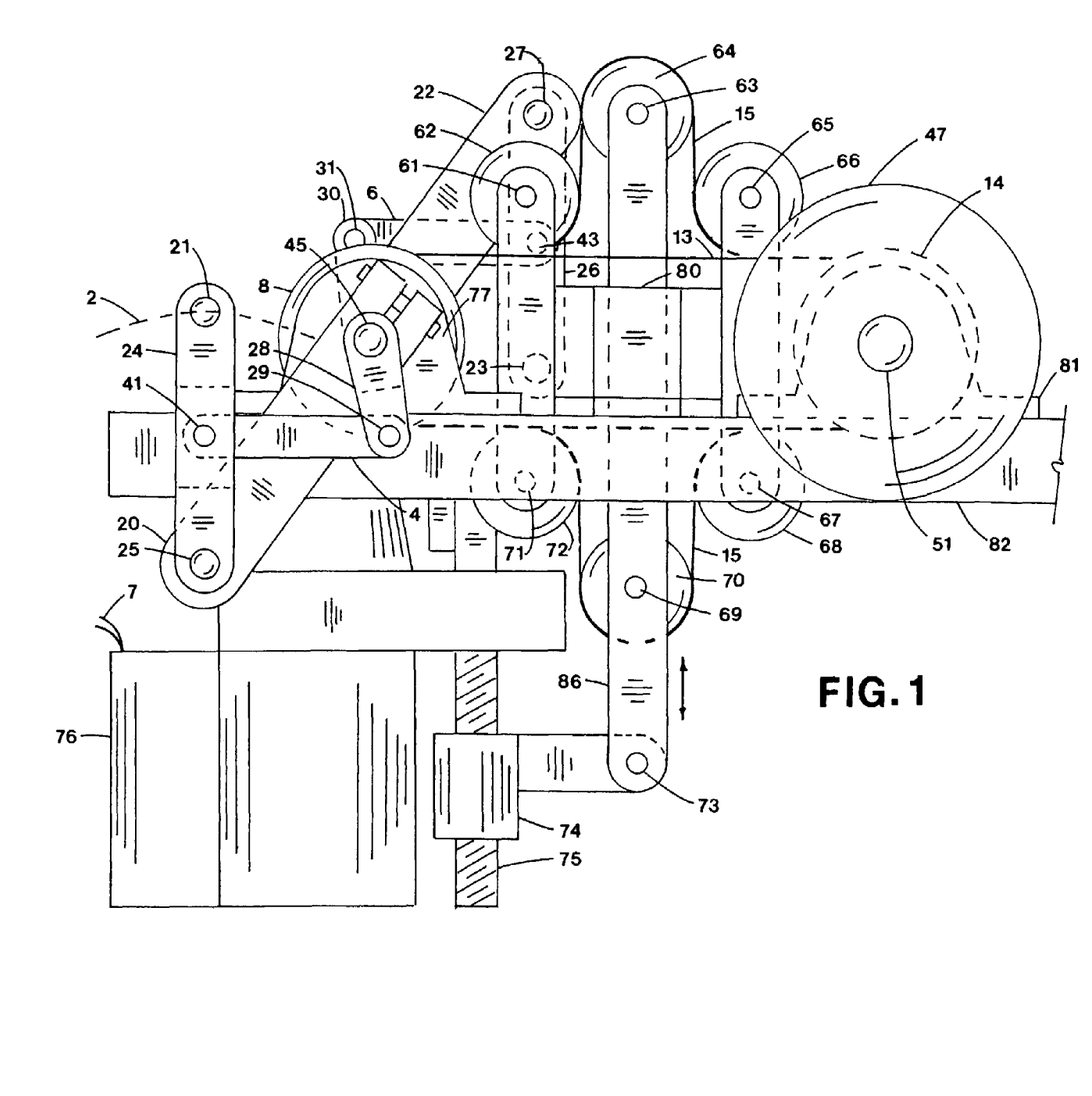
FIG. 1 is a side elevation view of the preferred embodiment of an adjustable drive constructed in accordance with the present invention.
Figure 2:
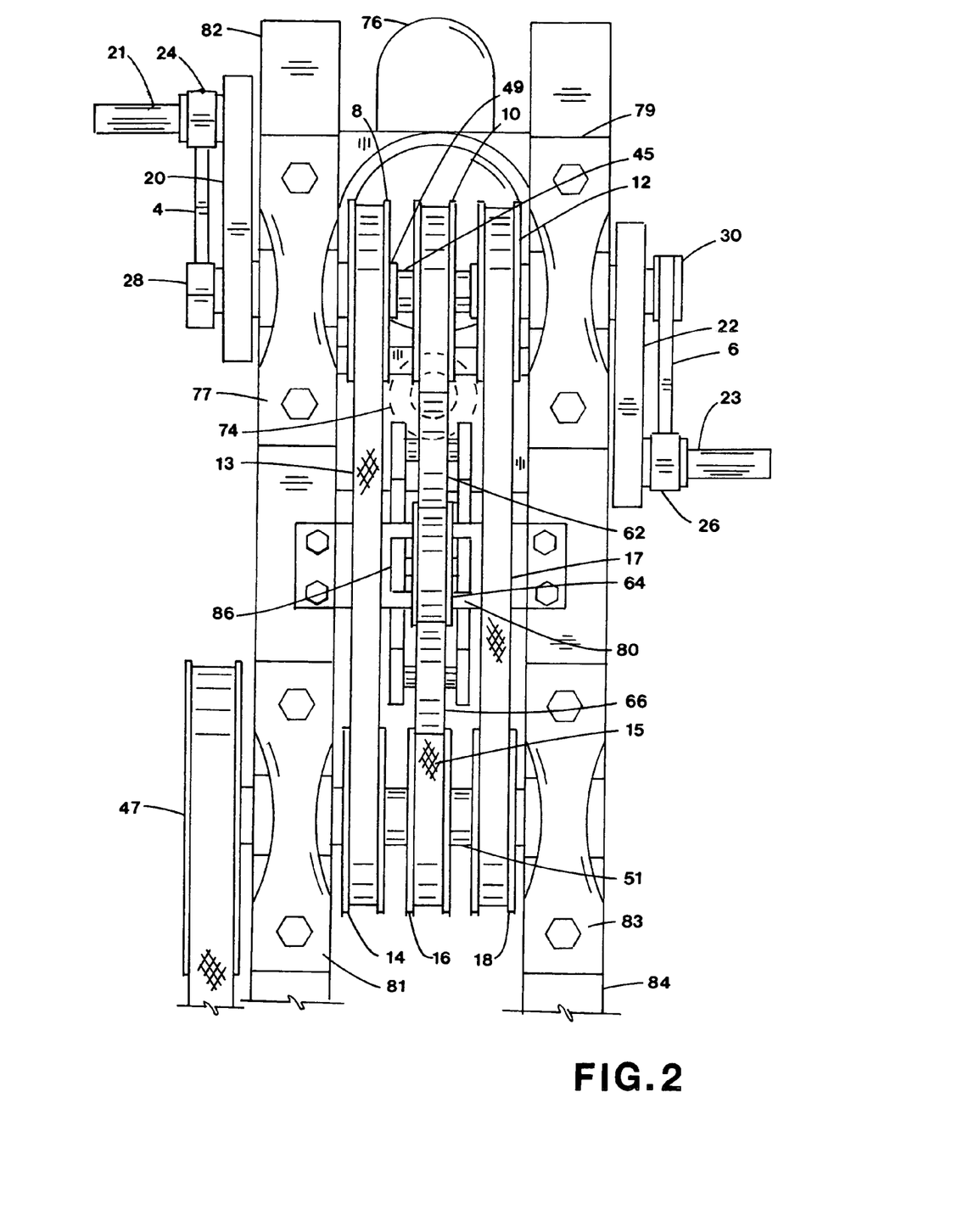
FIG. 2 is a top view of the preferred embodiment shown in FIG. 1.

Referring to the drawings in detail, the preferred embodiment of the adjustable drive is shown in FIGS. 1 and 2 where adjustment arms 28,30 are attached generally opposed to adjustment shaft 45 which forms a pivot axis. Crankshaft 49 is positioned concentric with adjustment shaft 45 and supported by bearings 77,79. Crank arms 20,22 are attached to crankshaft 49 in generally opposing directions. Crank links 24,26 are connected to crank arms 20,22 at pivots 25,27 and have drive pivots 21,23 positioned at the ends. Adjustment links 4,6 are connected to adjustment arms 28,30 at pivots 29,31 and to crank links 24,26 at pivots 41,43.

Crank arms 20,22, crank links 24,26, adjustment arms 28,30 and adjustment links 4,6 combine to form a pair of crank linkages. A rotation of adjustment arms 28,30 relative to crank arms 20,22 cause the predetermined distance between the drive pivots 21,23 to change relative to the pivot axis 45. Pulleys 8,12 are attached to crankshaft 49 which has a missing midsection. Pulley 10 is positioned in the missing midsection and is attached to adjustment shaft 45.

Jackshaft 51 is positioned distal to pivot axis 45 and supported by bearings 81,83. Pulleys 14,16,18 and 47 are attached to jackshaft 51. Timing belt 13 engages pulleys 8,14 and timing belt 17 engages pulleys 12,18 causing crank arm 20 to rotate at the same speed as crank arm 22. Timing belt 15 engages pulleys 10,16, idler pulleys 62,66,68,72 and movable pulleys 64,70. Idler pulleys 62,66,68,72 rotate about fixed pivots 61,65,67,71. Movable pulleys 64,70 are connected to slider link 86 at pivots 63,69. Slider link 86 is supported by slide bearing 80 to move back and forth relative to frame members 82,84.

Belts 13,15,17, pulleys 8,10,12,14,16,18,62,64,66,68,70, 72 and slider link 86 form a belt assembly that can change the angular relationship between adjustment shaft 45 and crankshaft 49. Actuator 76 is attached to frame 82,84 with threaded shaft 75 and threaded nut 74 connected to slider link 86 at pivot 73. When actuator 76 receives a signal to move threaded nut 74, slider link 86 will move causing pulley 10 to rotate relative to pulleys 8,12 which changes the predetermined distance between drive pivots 21,23 and pivot axis 45 along path 2. Adjustment of the predetermined distance occurs with pulley 47 moving or stationary. Bearings 77,79,81,83, slide bearing 80 and actuator 76 are supported by frame members 82,84. Actuator 76 is electrically controlled by wiring 7 from a remote location.

Figure 3:
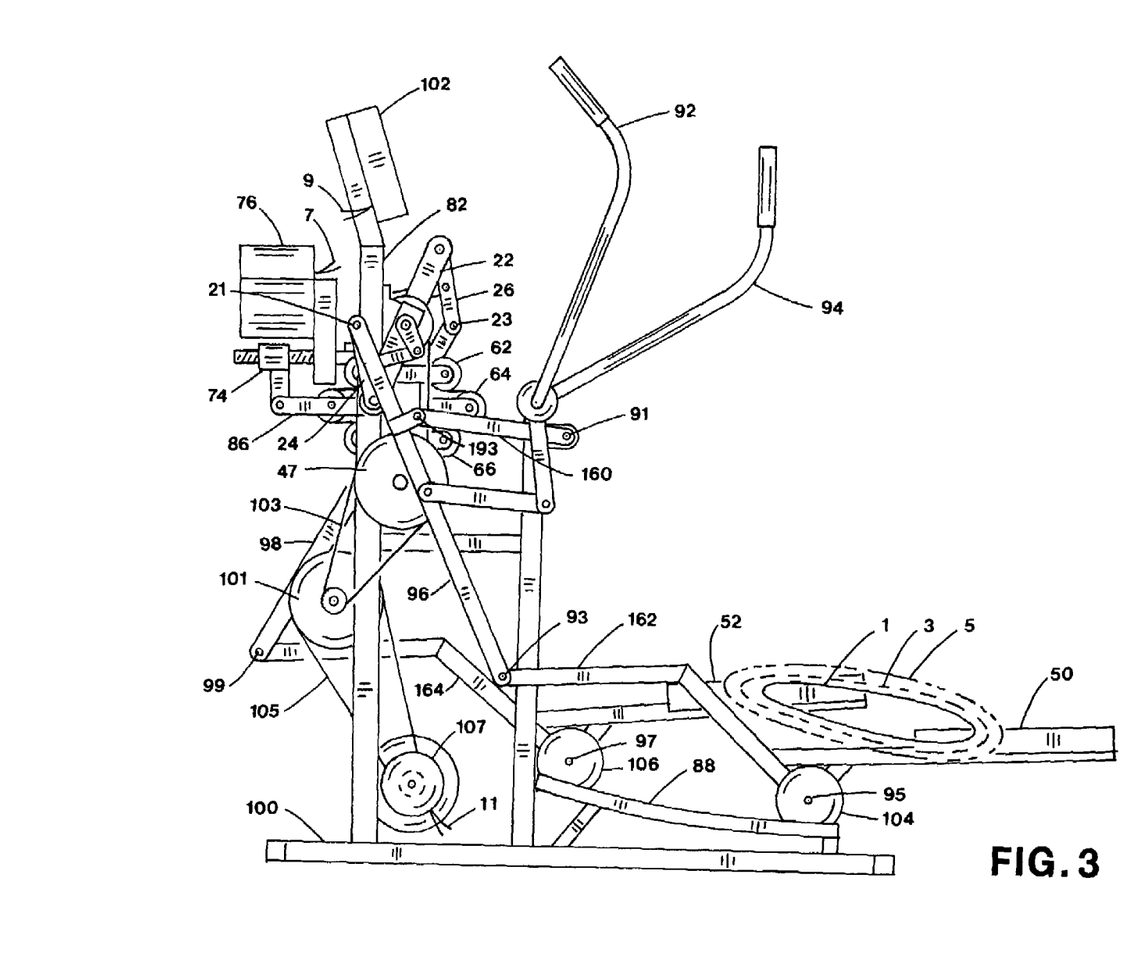
FIG. 3 is a side view of a front drive elliptical cross trainer incorporating the adjustable drive shown in FIGS. 1 and 2.

A first application of the adjustable drive is shown in FIG. 3 configured for a front drive elliptical cross trainer to change the path of pedals 50,52 from pedal curve 1 through pedal curve 3 to pedal curve 5. Drive pivots 21,23 are connected to coupler links 96,98 which connect to foot support members 162,164 at pivots 93,99. Rocker 160 is connected to coupler links 96,98 at pivots 193 and to frame 100 at pivot 91. Rollers 104,106 are connected to foot links 162,164 at pivots 95,97 and in rollable contact with track 88. Handles 92,94 for arm exercise move with coupler links 96,98.

Pulley 47 drives speedup pulley 101 with belt 103 and belt 105 drives alternator/flywheel 107 for load resistance. Other forms of load resistance such as friction, magnetic, fan, etc. can provide the load resistance. Pedal motion and load resistance are adjusted by signals from control 102 through wires 7,9,11 by conventional means (not shown).

Figure 4:
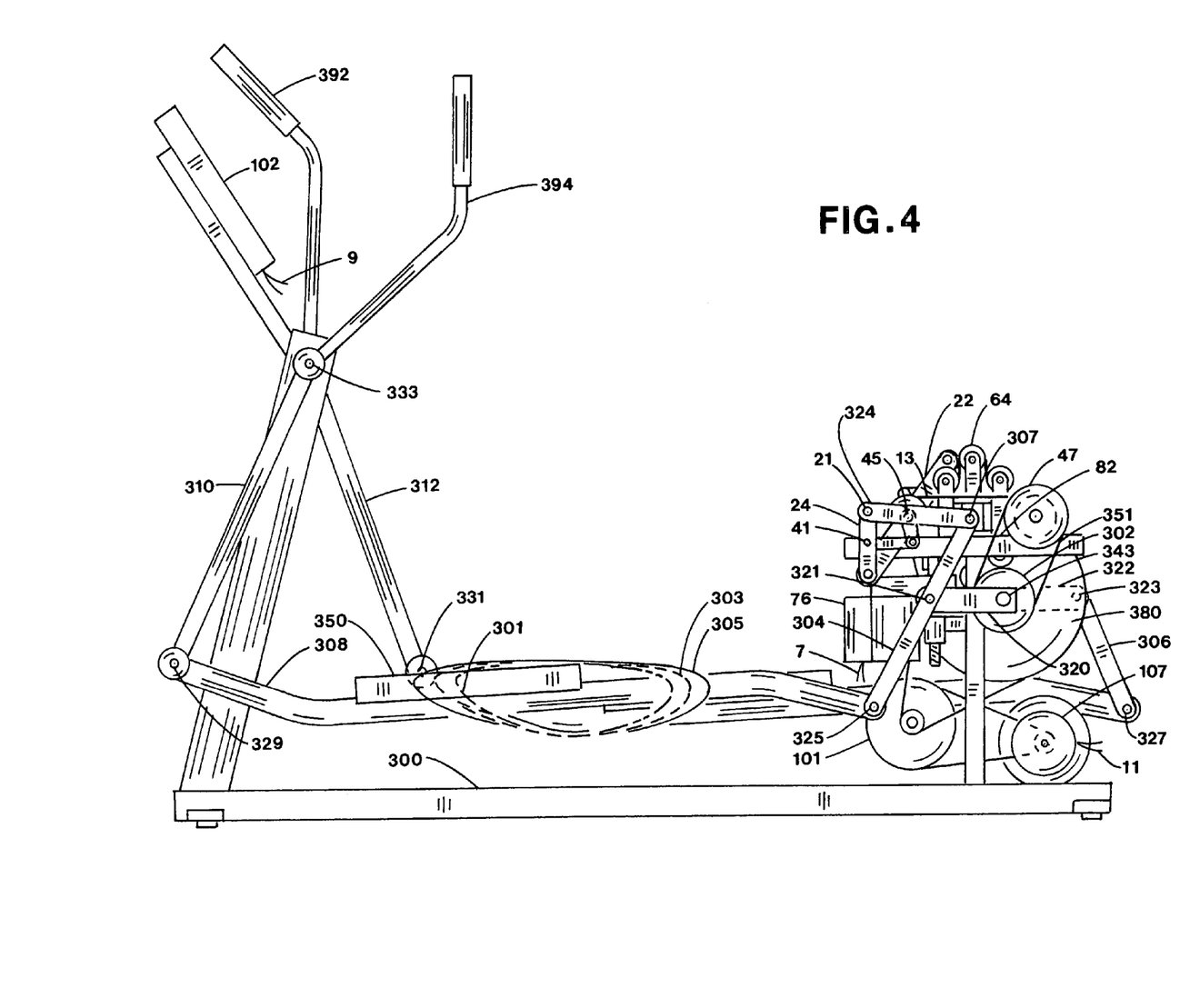
FIG. 4 is a side view of a rear drive elliptical cross trainer using the adjustable drive shown in FIGS. 1 and 2.

A second application of the adjustable drive is shown in FIG. 4 configured for a rear drive elliptical cross trainer to change the pedal 350 motion from pedal curve 301 to pedal curve 303 and pedal curve 305 when actuator 76 moves slider link 86. Crank 320 rotates about a second pivot axis 343 and is connected to drive link 304 at pivot 321. Connecting link 324 is connected to drive link 304 at pivot 307 and to crank link 24 at drive pivot 21. Pulleys 47 and 302 are engaged with belt 351 to rotate at the same speed.

Foot support 308 with pedal 350 is connected to drive link 304 at pivot 325 and to guide 310 at pivot 329. Guides 310, 312 connect to frame 300 at pivot 333 and extend upward to form handles 392,394 for arm exercise. Pulley 380 drives pulley 101 and alternator/flywheel 107 for load resistance. Control system 102 adjusts the pedal motion and load resistance through wires 7,9,11 by conventional means (not shown).

Figure 5:
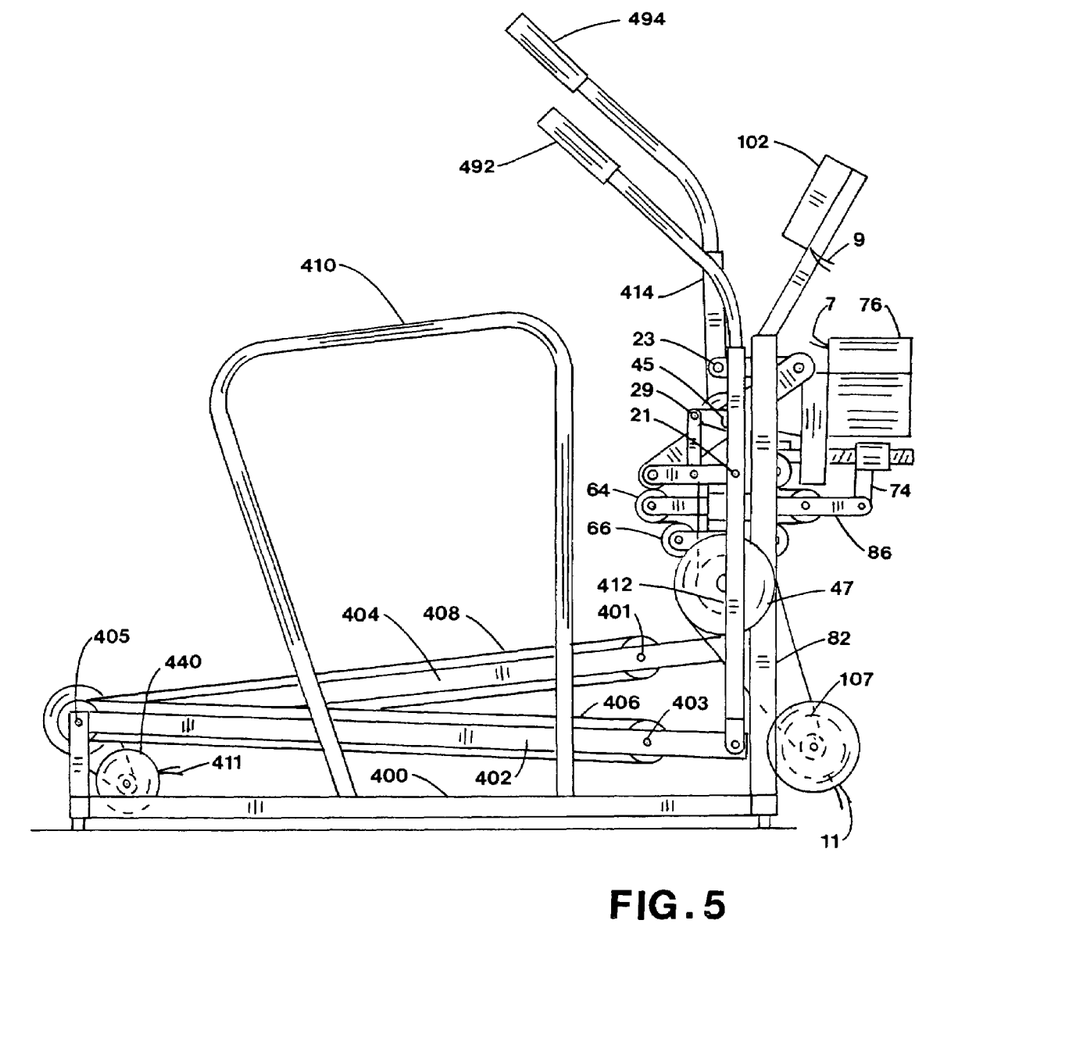
FIG. 5 is a side view of a pole tread climber incorporating the adjustable drive shown in FIGS. 1 and 2.

Another application of the adjustable drive is shown in FIG. 5 configured for a tread climber with pole arm motion. Drive pivots 21,23 are connected to coupler links 412,414 which are connected to treadles 402,404. Treadles 402,404 are connected to frame 400 at pivot 405 and support tread belts 406,408 at pivots 403,401. Motor 440 controls tread belt 406,408 speed. Coupler links 412,414 extend upwards to become handles 492,494 to provide pole arm exercise. In this application, actuator 76 controls the amount of up and down movement of treadles 402,404. Handle 410 is attached to frame 400. Control system 102 controls the range of treadle 402,404 movement, load resistance at alternator 107 and tread belt 406,408 speed through wires 9,11,411 by conventional means (not shown).

Figure 6:
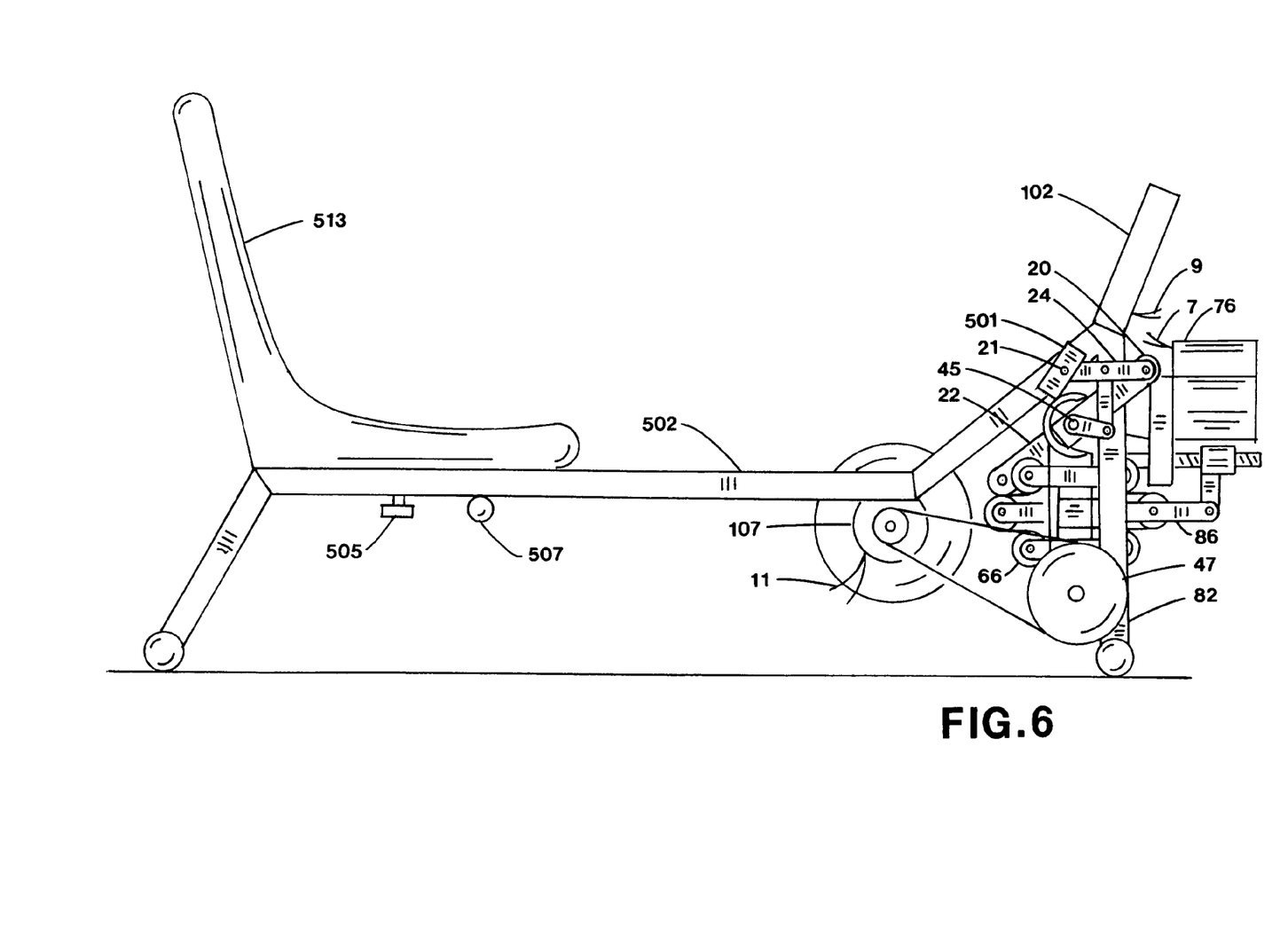
FIG. 6 is a side view of a recumbent exercise cycle incorporating the adjustable drive shown in FIGS. 1 and 2.

Another application of the adjustable drive is shown in FIG. 6 configured to change the motion of pedals 501,503 (503 not shown for clarity) for a recumbent bicycle. The operator is positioned in seat 513 where the feet move pedals 501,503 (503 not shown for clarity) which drives pulley 47 and alternator/flywheel 107. Seat 513 is supported by frame 502 and can be repositioned by knob 505. Handle 507 is attached to frame 502. Control system 102 adjusts the motion of pedals 501,503 (503 not shown for clarity) and load resistance 107 through wires 9,11 connected by conventional means (not shown).

Figure 7:
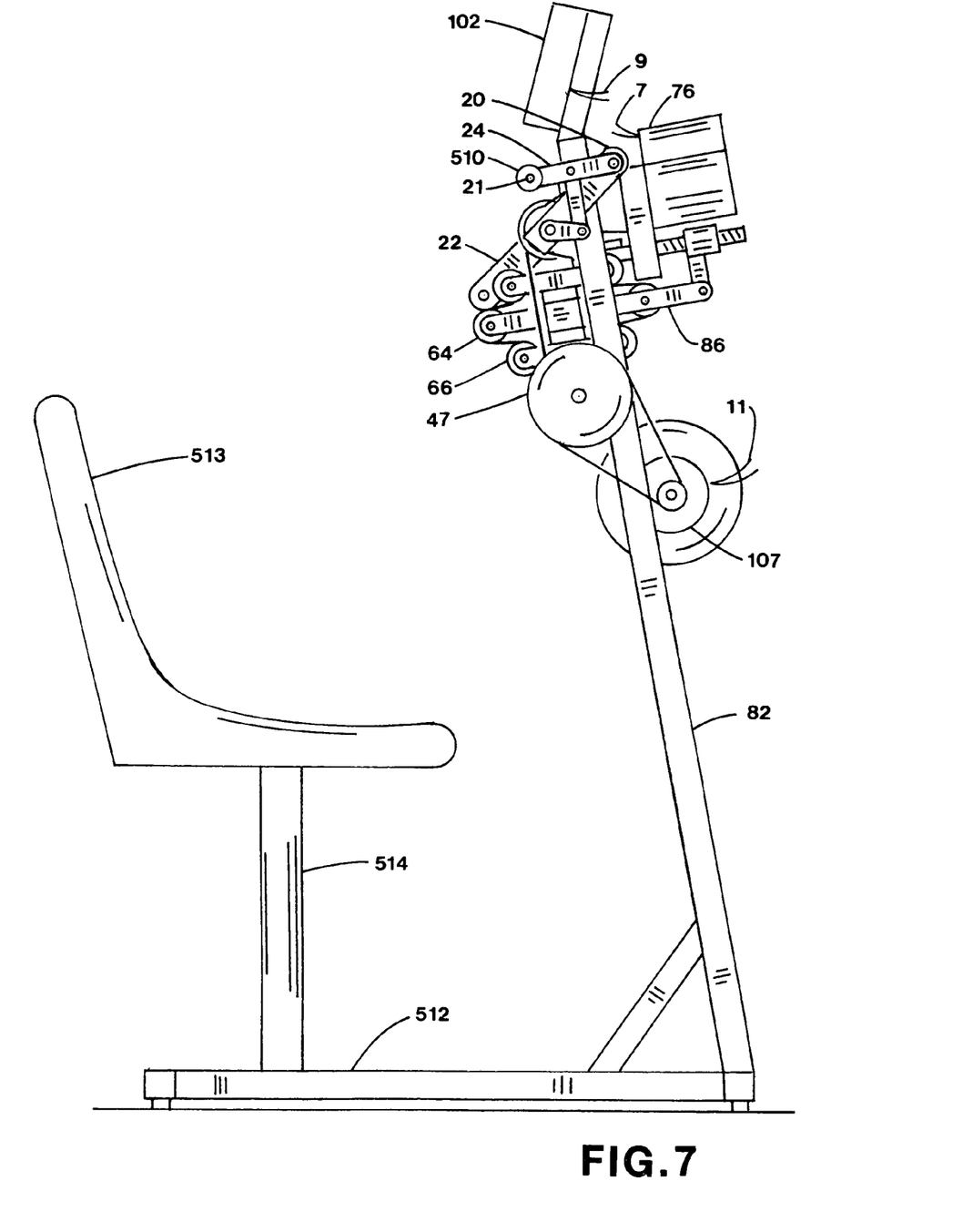
FIG. 7 is a side view of an arm exercise apparatus incorporating the adjustable drive shown in FIGS. 1 and 2.

Yet another application of the adjustable drive is shown in FIG. 7 for an upper body hand crank. Handles 510,511 (511 not shown for clarity) are connected to crank links 24,26 at drive pivots 21,23. Moving handles 510,511 (511 not shown for clarity) cause pulley 47 to drive alternator/flywheel 107 as load resistance. Seat 513 is supported by frame member 514 which is attached to frame 512. Control system 102 adjusts the diameter of handle 510,511 (511 not shown for clarity) movement through actuator 76 and load resistance 107 through wires 7,9,11 by conventional means (not shown).

The present invention may be embodied in other specific forms without departing from its spirit or essential characteristics. The described embodiments are to be considered in all respects only as illustrative, and not restrictive. The scope of the invention is, therefore, indicated by the claims, rather than by foregoing description. All changes which come within the meaning and range of equivalency of the claims are to be embraced within their scope.

What is claimed is:

1. An exercise apparatus comprising:
a frame, said frame configured to support an adjustable drive;
an adjustable drive having:
a pair of crank arms, each said crank arm configured to rotate about a pivot axis positioned upon said frame;
a pair of adjustment arms, each said adjustment arm configured to rotate about said pivot axis:
a pair of crank links, each said crank link pivotally coupled to a respective said crank arm;
a pair of adjustment links attached to an adjustable shaft, each said adjustment link pivotally coupled at one end thereof to a respective said crank link and pivotally coupled at the other end thereof to a respective said adjustment arm;
a jackshaft, said jackshaft configured to rotate relative to said frame;
a belt assembly, said belt assembly engaging said adjustment arms via said adjustment shaft and said jackshaft
a pair of drive pivots, each said drive pivot positioned upon a respective said crank link at a predetermined distance relative to said pivot axis to receive operator force;
said operator force causing said crank arms to rotate relative to said frame whereby said predetermined distance may be changed for operation of said exercise apparatus by said adjustment arm.

2. The adjustable drive according to claim 1 further comprising a drive pulley, said drive pulley configured to drive a load resistance.

3. The adjustable drive according to claim 1 further comprising a slider link, said slider link engaged with said belt to allow a change in said predetermined distance.

4. The exercise apparatus according to claim 1 further comprising a flywheel, said flywheel operably associated with said adjustable drive to rotate when an operator force impinges upon said drive pivot.

5. The exercise apparatus according to claim 1 further comprising a pair of foot support members, each said foot support member operably associated with said corresponding crank link at said drive pivot;
each foot of an operator engaged with a corresponding foot support member whereby movement of said foot causes said crank arm to move relative to said frame.

6. The exercise apparatus according to claim 4 further comprising a seat, said seat configured to allow said operator to rotate said crank arm in the form of a stationary exercise bicycle having an adjustable foot path.

7. The exercise apparatus according to claim 4 further comprising a pair of guides, each said guide operably associated with said foot support member to form a cross trainer exercise apparatus whereby said adjustment arm can change the foot path.

8. The exercise apparatus according to claim 1 further comprising a pair of handles, operably associated with said corresponding crank link at said drive pivot;
each hand of an operator engaged with a corresponding handle whereby movement of said hand causes said adjustable drive to move.

9. The exercise apparatus according to claim 1 further comprising an actuator, said actuator operably associated with said belt assembly to change said predetermined distance during operation of said exercise apparatus.

10. The exercise apparatus according to claim 9 further comprising a control system, said control system operably associated with said actuator to automatically change said predetermined distance according to a programmed procedure.

11. The adjustable drive according to claim 1 further comprising a handle, said handle pivotally connected to said drive pivot for arm exercise whereby said arm exercise can be adjusted.

12. The adjustable drive according to claim 1 wherein said belt assembly includes a first set of pulleys, said first set of pulleys attached to said jackshaft and a second set of pulleys, said second set of pulleys operably associated with said adjustment arms.

13. An exercise apparatus comprising:
a frame, said frame configured to support an adjustable drive;
an adjustable drive having:
a pair of crank linkages, each said crank linkage configured to rotate about a pivot axis positioned upon said frame;
a jackshaft, said jackshaft configured to rotate relative to said frame;
a first set of pulleys, said first set of pulleys attached to said jackshaft and a second set of pulleys, said second set of pulleys operably associated with said crank linkages;
a belt assembly, said belt assembly engaging said first and said second set of pulleys;
an actuator, said actuator operably associated with said belt assembly and said frame;
a slider link, said slider link pivotally connected to said actuator and operably associated with said frame;
a pair of movable pulleys, said pair of movable pulleys pivotally connected to said slider link and operably engaged with said belt assembly;
a pair of drive pivots, each said drive pivot positioned upon a respective crank linkage at a predetermined distance relative to said pivot axis to receive operator force;
said operator force causing said crank linkages to rotate relative to said frame whereby said predetermined distance may be changed during operation of said exercise apparatus by said actuator moving said slider link to a different position.

14. The exercise apparatus according to claim 13 further comprising a load resistance, said load resistance operably associated with said adjustable drive and, a means for adjustment of said load resistance, said means for adjustment configured to allow for variable intensity exercise.

15. The exercise apparatus according to claim 13 further comprising a pair of foot support members, each said foot support member operably associated with said corresponding crank linkage at said drive pivot;

each foot of an operator engaged with a corresponding foot support member whereby movement of said foot causes said crank linkage to move relative to said frame.

16. The exercise apparatus according to claim 15 further comprising a pair of guides, each said guide operably associated with said foot support member to form a cross trainer exercise apparatus whereby said actuator can change the path of motion of the foot support members.

17. An exercise apparatus comprising:

a frame, said frame configured to support an adjustable drive;

an adjustable drive having:

a pair of crank arms, each said crank arm configured to rotate about a pivot axis positioned upon said frame;

a pair of adjustment arms, each said adjustment arm configured to rotate about said pivot axis;

a pair of crank links, each said crank link pivotally coupled to a respective said crank arm;

a pair of adjustment links attached to an adjustable shaft, each said adjustment link pivotally coupled at one end thereof to a respective said crank link and pivotally coupled at the other end thereof to a respective said adjustment arm;

a jackshaft, said jackshaft configured to rotate relative to said frame;

a belt assembly, said belt assembly engaging said adjustment arms via said adjustment shaft and said jackshaft a pair of drive pivots, each said drive pivot positioned upon a respective crank link at a predetermined distance relative to said pivot axis to receive operator force;

a pair of foot supports, each said foot support operably associated with a respective drive pivot and having a foot engaging pedal;

a pair of guides, each said guide operably associated with a respective foot support member to cause a portion of said foot support member to have back and forth movement;

said operator force upon said pedals causing said crank arms to rotate relative to said frame whereby said predetermined distance may be changed by said adjustment arms to change to path of said pedals.

18. The adjustable drive according to claim 17 further comprising a drive pulley, said drive pulley configured to drive a load resistance.

19. The exercise apparatus according to claim 17 further comprising an actuator, said actuator operably associated with said adjustment arms to change said predetermined distance during operation of said exercise apparatus.

20. The exercise apparatus according to claim 19 further comprising a control system, said control system operably associated with said actuator to automatically change said predetermined distance according to a programmed procedure.

* * * * *